(12) United States Patent
Koto et al.

(10) Patent No.: US 7,177,360 B2
(45) Date of Patent: Feb. 13, 2007

(54) VIDEO ENCODING METHOD AND VIDEO DECODING METHOD

(75) Inventors: Shinichiro Koto, Machida (JP); Takeshi Chujoh, Tokyo (JP); Yoshihiro Kikuchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 620 days.

(21) Appl. No.: 10/657,276

(22) Filed: Sep. 9, 2003

(65) Prior Publication Data
US 2004/0057515 A1 Mar. 25, 2004

(30) Foreign Application Priority Data

Sep. 20, 2002 (JP) ............................. 2002-275565
Sep. 30, 2002 (JP) ............................. 2002-288017

(51) Int. Cl.
*H04N 7/12* (2006.01)

(52) U.S. Cl. ............ 375/240.16; 375/240; 375/240.01; 375/240.12

(58) Field of Classification Search ................ 375/240, 375/240.01, 240.12, 240.16
See application file for complete search history.

(56) References Cited

U.S. PATENT DOCUMENTS 6,125,140 A * 9/2000 Wilkinson .................. 375/240
6,404,813 B1 6/2002 Haskell et al.

FOREIGN PATENT DOCUMENTS

JP 11-75191 3/1999
WO WO 01/33864 A1 5/2001

OTHER PUBLICATIONS

ISO/IEC 14496-2:1999/Amd. 1:2000 (E), Jul. 2000, p. 220.

* cited by examiner

*Primary Examiner*—Allen Wong
(74) *Attorney, Agent, or Firm*—Oblon, Spivak, McClelland, Maier & Neustadt, P.C.

(57) ABSTRACT

A video encoding method comprises selecting, from predictive modes, a predictive mode, computing a first cost of encoding based on a predictive mode, computing a second cost of encoding based on a direct mode, comparing the second cost with the first cost to determine an optimum predictive mode, and encoding the pixel block by the motion compensation predictive encoding according to the optimum predictive mode.

20 Claims, 11 Drawing Sheets

VIDEO ENCODING METHOD AND VIDEO DECODING METHOD

CROSS-REFERENCE TO RELATED APPLICATIONS

This application is based upon and claims the benefit of priority from the prior Japanese Patent Applications No. 2002-275565, filed Sep. 20, 2002; and No. 2002-288017, filed Sep. 30, 2002, the entire contents of both of which are incorporated herein by reference.

BACKGROUND OF THE INVENTION

1. Field of the Invention

The present invention relates to a video encoding method and a video decoding method, more particularly to a motion compensation predictive interframe encoding method and decoding method using a plurality of reference frames.

2. Description of the Related Art

In video encoding schemes such as MPEG 4 (International Organization for Standardization/IEC 14496-2) or MPEG4 Advanced Video Coding (H.264/International Organization for Standardization/IEC 14496-10), using a plurality of reference frames and a plurality of predictive modes, the video is encoded by selecting an optimum predictive mode and an optimum reference frame in units of a pixel block unit. This improves a predictive efficiency, and realizes high efficiency compression encoding. In such an encoding system, it is necessary for identifying a reference frame and a predictive mode to encode identification information identifying them and motion vector information (referred to as motion compensation predictive information) every encoding block.

For the purpose of improving the predictive efficiency more, if kinds of predictive mode are increased or information of a motion vector is encoded every block, the number of encoded bits of the motion compensation predictive information increases. As a result, improvement of the predictive efficiency and increase of the number of encoded bits of motion compensation predictive information are offset. In other words, the encoding efficiency is not improved in total.

To evade increase of the number of bits of motion compensation predictive information is used a methods for automatically generating motion compensation predictive information of a current block not by using motion compensation information of an existing block encoding but by using motion compensation predictive information in the peripheral pixel block which is already encoded or the other flame which is already encoded.

In MPEG-4 video encoding is adopted a scheme for generating motion compensation information from adjacent blocks or flames without encoding the motion compensation information in a direct mode and a predictive mode as referred to as a skipped macroblock. In generation of the motion compensation information, the correlation of motion compensation information is supposed in a frame or between frames every pixel block. Motion compensation parameters are estimated from peripheral motion compensation information according to a given rule. It is possible by using the same estimate rule in an encoding time and a decoding time to perform motion compensation prediction normally and decode the result.

In the video encoding standard scheme of ISO/IEC MPEG-4, a direct mode is used in bidirectional predictive interframe encoding (B picture) as an encoding mode. This encoding generates motion compensation predictive information using, as a predictive source, macroblocks of spatially the same position on an intraframe encoded frame (I picture) most near to a current frame with respect to time or an interframe predictive encoded flame (P picture). This method decreases redundancy of additional information such as motion vector information. Specifically, if a predictive source macroblock is an interframe predictive encoded frame (P picture), its motion vector is scaled according to a temporal position of a to-be-predicted macroblock to generate motion compensation predictive information.

It is a problem of this method that the to-be-predicted macroblock must be located between the predictive source macroblock and the reference frame of the predictive source macroblock. Therefore, when the to-be-predicted macroblock is predicted only by a plurality of past reference frames or when the predictive source macroblock has a plurality of reference frames, how to generate the motion compensation predictive information is not clear.

As described above, when the motion compensation information is estimated to decrease the encoding overhead of the motion compensation information, the encoding efficiency is controlled greatly according to the property of an estimation rule, that is, according to whether or not appropriate movement predictive information can be automatically generated. When the estimation of motion compensation information is not appropriate, the encoding efficiency deteriorates, resulting in degrading picture quality or increasing the number of encoded bits.

In addition, when a predictive picture is made only by a plurality of past reference frames or the predictive source has a plurality of reference frames, an appropriate direct mode cannot be realized.

BRIEF SUMMARY OF THE INVENTION

It is an object of the present invention to provide a method of encoding and decoding a video appropriately by adequately selecting encoding modes.

According to an aspect of the present invention, there is provided a video encoding method of encoding an input video signal by a motion compensation predictive interframe encoding, comprising: selecting, from a plurality of predictive modes, a predictive mode including determining a motion vector of a to-be-encoded pixel block using a motion vector of an encoded pixel block of a reference frame adjacent to the to-be-encoded frame; computing a first cost of encoding based on the selected predictive mode; computing a second cost of encoding based on a direct mode including determining a motion vector of the to-be-encoded pixel block from a motion vector of a block around the to-be-encoded pixel block; comparing the second cost with the first cost to determine an optimum predictive mode; and encoding the pixel block by the motion compensation predictive encoding according to the optimum predictive mode.

DETAILED DESCRIPTION OF THE INVENTION

Figure 1:
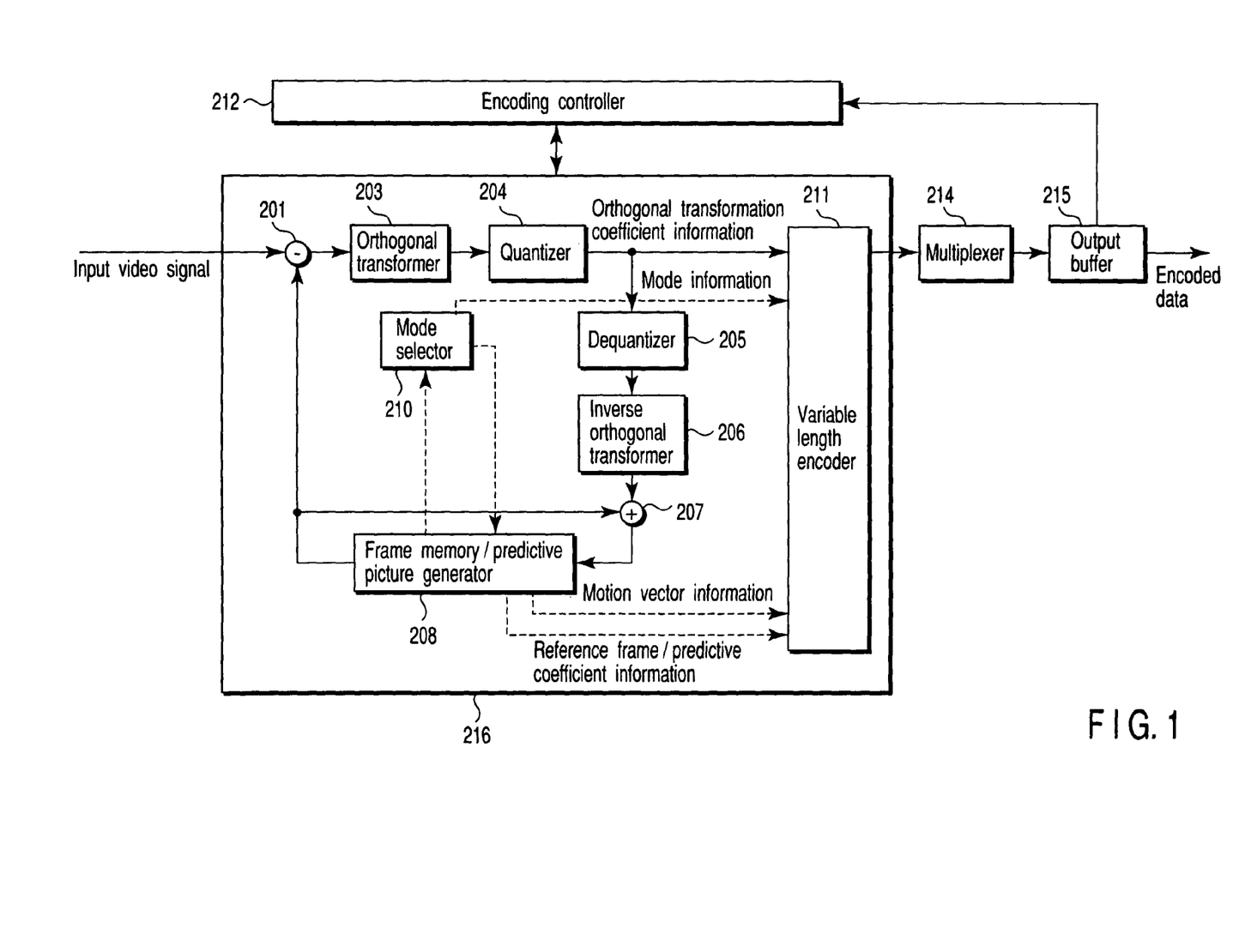
FIG. 1 is a block diagram of a video encoding apparatus according to an embodiment of the present invention.

FIG. 1 is a block diagram of a video encoding apparatus according to an embodiment of the present invention. The configuration of the video encoding apparatus of FIG. 1 will be described hereinafter.

An input video signal is divided into a plurality of pixel blocks. A motion vector is detected and an optimum predictive mode is selected from a plurality of predictive modes every pixel block, using a plurality of reference frames stored in a frame memory 208. A predictive picture is generated using the detected motion vector and the selected predictive mode. A predictive error signal between the predictive picture and input picture is calculated with a subtracter 201. An orthogonal transformation (for example, DCT) is subjected to the predictive error signal by an orthogonal transformer 203.

A quantizer 204 quantizes an orthogonal transformation coefficient. The quantized orthogonal transformation coefficient is variable-length-encoded by a variable length encoder 211 along with information concerning the motion compensation predictive method such as predictive mode information, motion vector information, reference frames, and predictive coefficient information. A multiplexer 214 multiplexes these encoded information and outputs a coded data through an output buffer 215.

The quantized orthogonal transformation coefficient is decoded by a dequantizer 205, an inverse orthogonal transformer 206, a motion compensation predictive decoder 207, and is saved in a frame memory 208 as a reference frame. An encoding controller 212 carries out the entire control for the encoder 216 such as a rate control for controlling the number of encoded bits by controlling quantization characteristics by feedback of the number of encoded bits or control of an interframe predictive configuration.

A concrete predictive mode will be described referring to FIGS. 2 and 3.

In the present embodiment, one or two reference frames are selected from a plurality of reference frames every pixel block. A motion vector for motion compensation is detected with respect to the selected reference frame. A reference pixel block is extracted from the selected reference frame, using the detected motion vector. When two reference frames are selected, two pixel blocks are extracted. A predictive signal is generated by a linear sum of the extracted pixel blocks.

Figure 2:
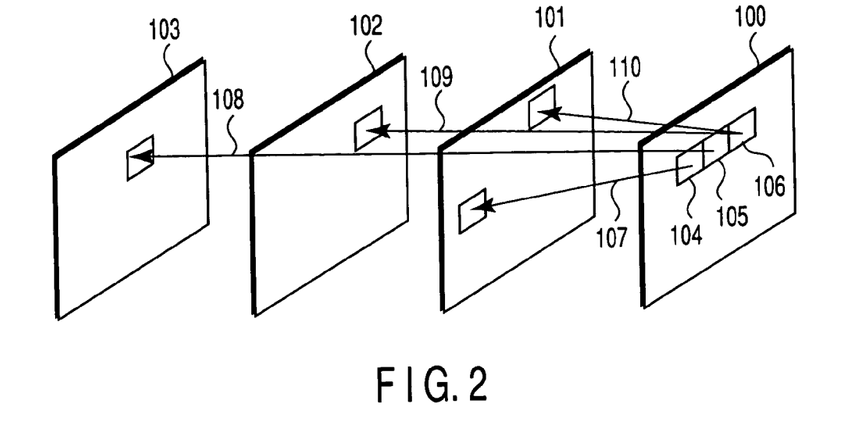
FIG. 2 is a diagram for explaining motion compensation prediction related to the embodiment of the present invention.

FIG. 2 shows an example for performing a prediction using only a plurality of past frames. A to-be-encoded flame 100 and reference frames 101 to 103 are shown. In addition, to-be-encoded pixel blocks 104, 105 and 106 are shown. The reference frame 101 is selected with respect to the pixel block 104. Predictive mode information representing a one-frame prediction using a motion vector 107 is encoded. The reference frame 103 is selected with respect to the pixel block 105. Predictive mode information representing a one-frame prediction using a motion vector 108 is encoded. The reference frames 101 and 102 are selected with respect to the pixel block 106. Predictive mode information representing a two-frame prediction using the motion vectors 109 and 110 is encoded.

Figure 3:
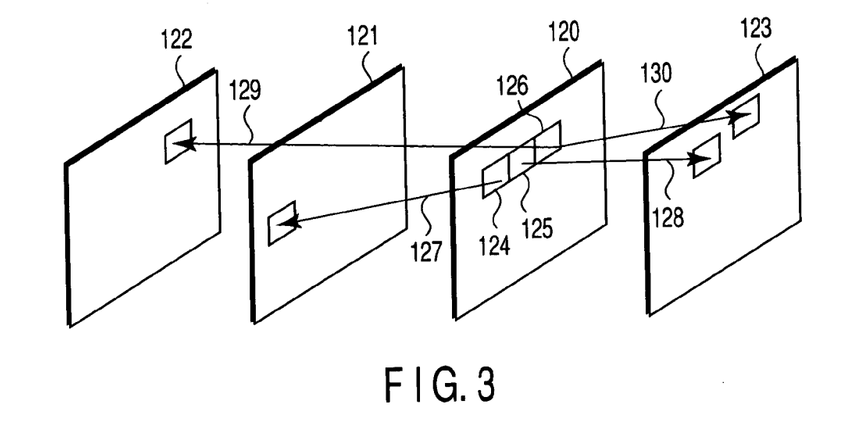
FIG. 3 is a diagram for explaining motion compensation prediction related to the embodiment of the present invention.

FIG. 3 is an example of performing a prediction from a plurality of frames including past and future frames. A frame 120 shows a to-be-encoded flame, and frames 121 to 123 each show a reference frame. Blocks 124, 125 and 126 each show a to-be-encoded pixel block. The forward reference frame 121 is selected with respect to the pixel block 124. Predictive mode information representing a one-frame prediction using a motion vector 127 is encoded. The backward reference frame 123 is selected with respect to the pixel block 125. Predictive mode information representing a one-frame prediction using a motion vector 128 is encoded. The forward and backward reference frames 122 and 123 are used with respect to the pixel block 126. Predictive mode information representing a two-frame prediction using motion vectors 129 and 130 is encoded.

If a motion vector, a reference frame and predictive mode information are encoded every pixel block as described above, overhead in encoding these information increases, resulting in disturbing improvement of the encoding efficiency. For this reason, in the present embodiment, the information concerning the motion compensation is not encoded with respect to the pixel block satisfying a specific condition at all, but an encoding mode referred to as a direct mode is adopted. According to the direct mode, the motion vector, reference frame, and predictive mode of the to-be-decoded pixel block are determined by the motion vector, reference frame and predictive mode of a pixel block adjacent to the to-be-decoded pixel block or the pixel block of a decoded frame, and decoded. The direct mode improves the encoding efficiency.

In the present embodiment, a plurality of direct modes, that is, a plurality of determination units for determining the motion vector, reference frame and predictive mode in decoding are provided and switched adequately according to a give condition to improve the encoding efficiency further.

Figure 4:
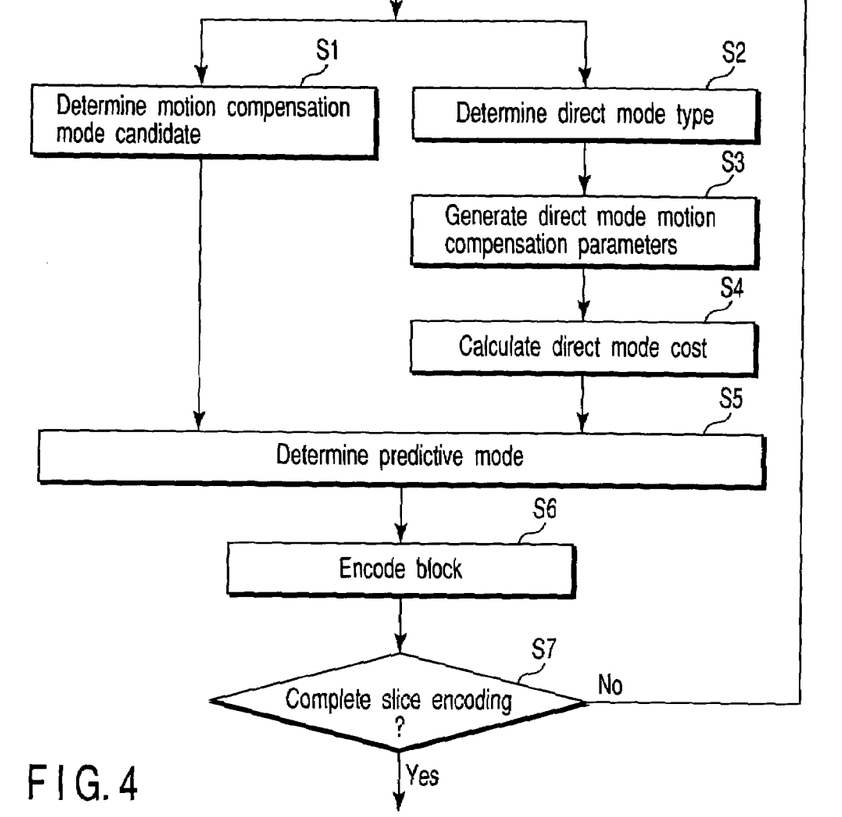
FIG. 4 is a flow chart of a predictive mode determination process of the video encoding apparatus according to the embodiment of the present invention.

FIG. 4 is a flow chart showing schematically a predictive mode determination procedure in an encoder related to the embodiment of the present invention. Each encoded frame is divided into one or more regions (referred to as slices). Each slice is divided into a plurality of pixel blocks. A predictive mode is selected from a plurality of predictive modes including a direct mode in units of a pixel block, and the encoding is performed according to the selected predictive mode.

In FIG. 4, a predictive mode having a high encoding efficiency and a minimum encoding cost, that is, a predictive mode having the reduced number of encoded bits and a good picture quality is selected from a plurality of predictive modes every pixel block (step S1).

In addition, a direct mode type is determined according to various conditions such as small motion of scene, uniform motion of scene, entire motion of scene (step S2). Motion compensation parameters such as a motion vector or reference frame are generated according to the determined direct mode type (step S3). A cost in the predictive encoding using the motion compensation parameters, that is, encoding efficiency of the direct mode is calculated (step S4).

The encoding cost in the predictive mode selected in step S1 is compared with the encoding cost in the direct mode obtained in step S4 to determine the final predictive mode (step S5). The pixel block is subjected to motion compensation predictive encoding, using the determined predictive mode (step S6). The above steps are carried out about all blocks in the slice sequentially. When the encoding of all the blocks in the slice is completed, the process advances to steps for encoding the next slice (step S7).

In the above encoding, when the direct mode is determined as the final predictive mode, information concerning motion compensation is not encoded. On the decoding side, the motion vector, reference frame and predictive mode of the to-be-decoded block is determined using motion compensation information such as motion vector, reference frame and predictive mode of the decoded block or blocks around the to-be-decoded block to decode it.

Each step of the flow chart of FIG. 4 is explained in detail hereinafter.

Figure 5:
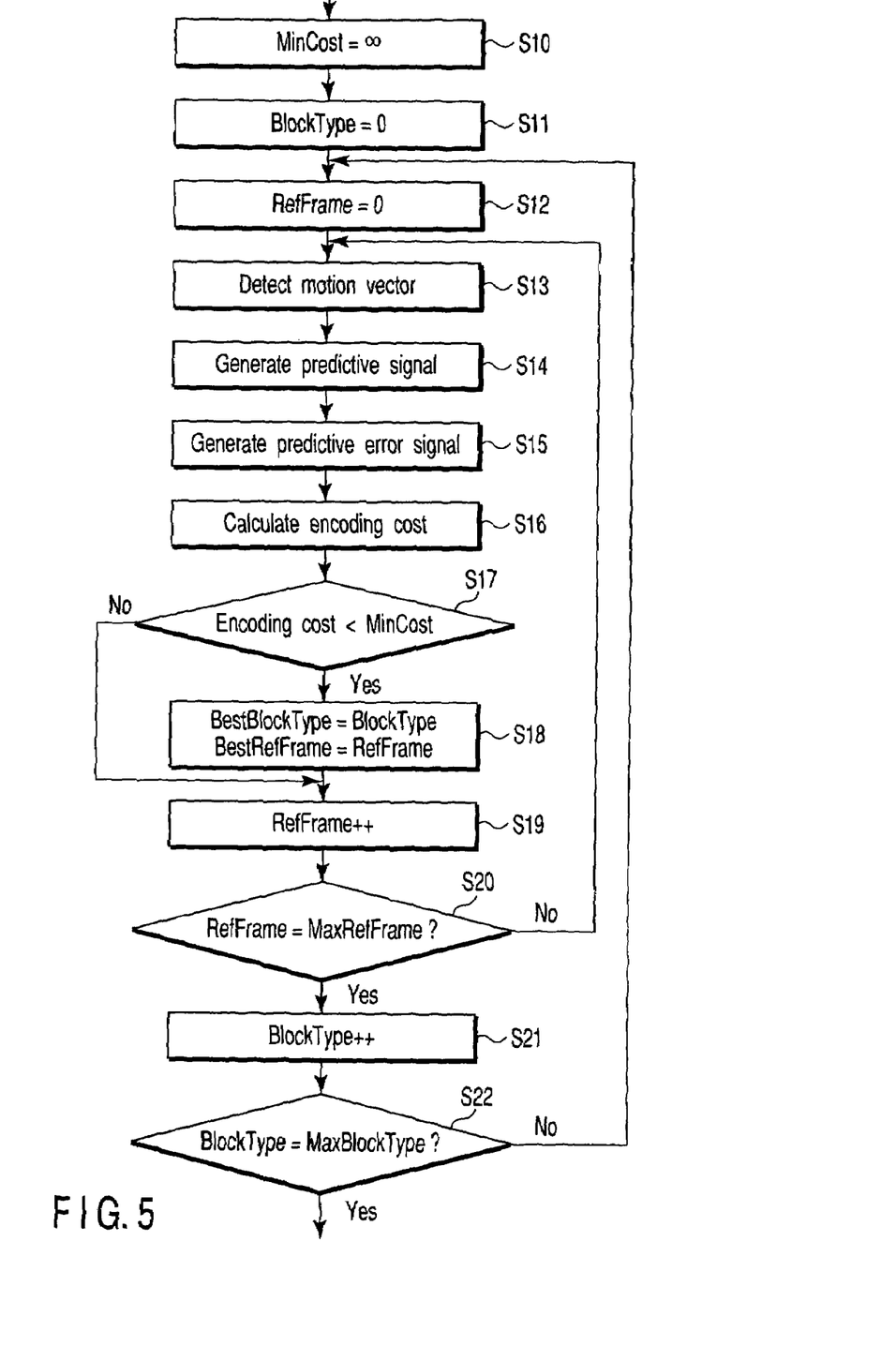
FIG. 5 is a flow chart of a predictive mode determination process of the video encoding apparatus according to the embodiment of the present invention.

FIG. 5 is a flow chart to show a detailed process of step S1 in FIG. 4. The process of FIG. 5 is done every pixel block. The maximum is set to the initial value of the minimum encoding cost MinCost (step S10). 0 is set to the index BlockType showing a shape mode of a predictive block (step S11). 0 is set to the index RefFrame identifying a reference frame (step S12). The shapes of the block include 16×16 blocks, 8×16 blocks, 16×8 blocks, 4×4 blocks, etc.

A motion vector is detected using the set block shape and reference frame (step S13). A predictive signal is generated using the detected motion vector (step S14). A predictive error signal is generated from the predictive signal and the signal of the to-be-encoded block (step S15). An encoding cost in the predictive mode is calculated (step S16). If the encoding cost is less than the minimum cost MinCost, the index BestBlockType of the optimum block shape and the index BestRefFrame of the optimum reference frame are updated (steps S17 and S18).

The index of the reference frame is updated (step S19). The motion detection and cost calculation are repeated for all reference frames (step S20). After the cost calculation for the prediction using each reference frame is done with respect to a block shape, the index BlockType indicating the block shape is updated (step S21), and the cost calculation for the prediction using each reference frame is executed for all block shapes again (step S22).

When the process of FIG. 5 is finished, an optimum block shape BestBlockType and an optimum reference frame BestRefFrame are determined with respect to the encoding block. Identification information of the motion vector, block shape and reference frame are encoded as header information every encoded block in a normal predictive mode.

FIGS. 6 to 12 show a plurality of examples of a direct mode type determination step in FIG. 4 (S2). The direct mode differs from the normal predictive mode, because the motion vector, block shape and identification information of reference frame are not encoded, but they are automatically generated using motion compensation predictive information of the peripheral pixel blocks.

In the present embodiment, a plurality of automatic generation methods of generating automatically motion compensation parameters in the direct mode (referred to as a direct type hereinafter) are prepared. The automatic generation methods are switched adequately according to information of peripheral pixel blocks. A determination method of the direct type and a determination method of the motion compensation parameter in each direct mode are defined as a rule, and the same parameter is generated in encoding and decoding.

The direct mode can reduce the overhead that encodes a motion compensation parameter, resulting in improving the encoding efficiency. Furthermore, the direct mode suitable for a property of picture is selected automatically by switching a plurality of direct types. This improves the encoding efficiency more.

In FIGS. 6 to 12, the modes 1, 2 and 3 show the direct types respectively. The motion compensative parameters are generated using a correlation with respect to forward (future) and backward (past) frames in the mode 1, a correlation with respect to the past frame in the mode 2, and a spatial correlation in the mode 3. Each mode will be described hereinafter.

Figure 6:
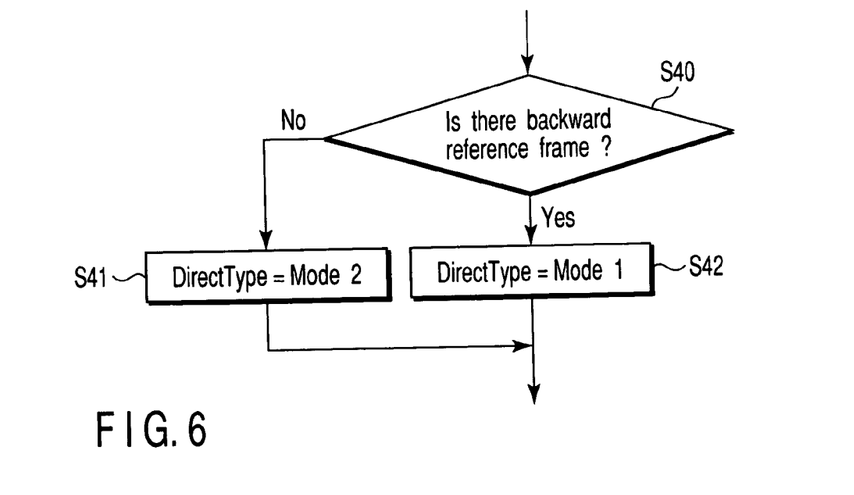
FIG. 6 is a flow chart of a direct mode type determination process related to the embodiment of the present invention.

In the example of FIG. 6, the direct type is switched between the modes 1 and 2 depending on whether the backward (future) reference frame exists with respect to the to-be-encoded frame (step S40). This makes it possible to set an optimum direct mode type considering a difference of interframe predictive configuration, namely a prediction based on only a past frame or a prediction based on past and future reference frames. In other words, the motion compensation parameter is generated by using a correlation with respect to the past and future frames if there is a future reference frame and by using a correlation with respect to the past frame if there is no future reference frame.

Figure 7:
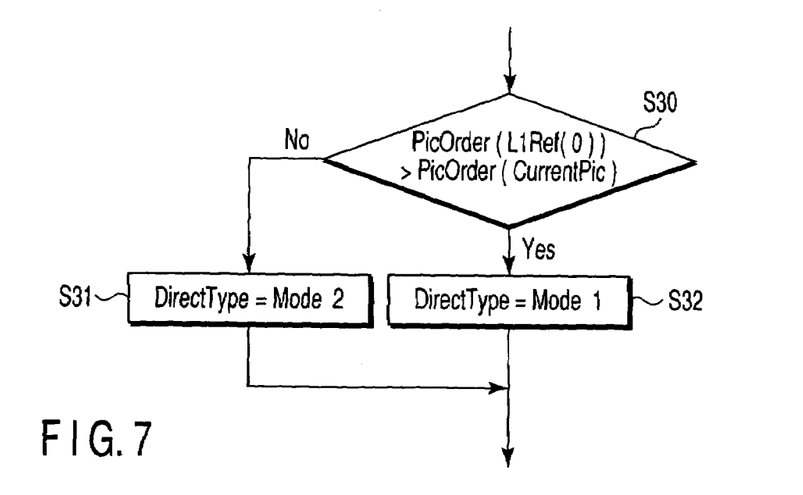
FIG. 7 is a flow chart of another direct mode type determination process related to the embodiment of the present invention.

In the example of FIG. 7, the direct type is switched between the first mode and the second mode when the picture order PicOrder(L1Ref(0)) of the zero-numbered reference frame L1Ref(0) with respect to the current encoding frame is higher than the picture order PicOrder(CurrentPic) of the to-be-encoded frame and it is not so. The example of FIG. 7 has substantially the same effect as that of the example of FIG. 6, but the direct type can be changed flexibly depending on whether the zero-numbered reference frame is set to a future frame or a past frame.

Figure 8:
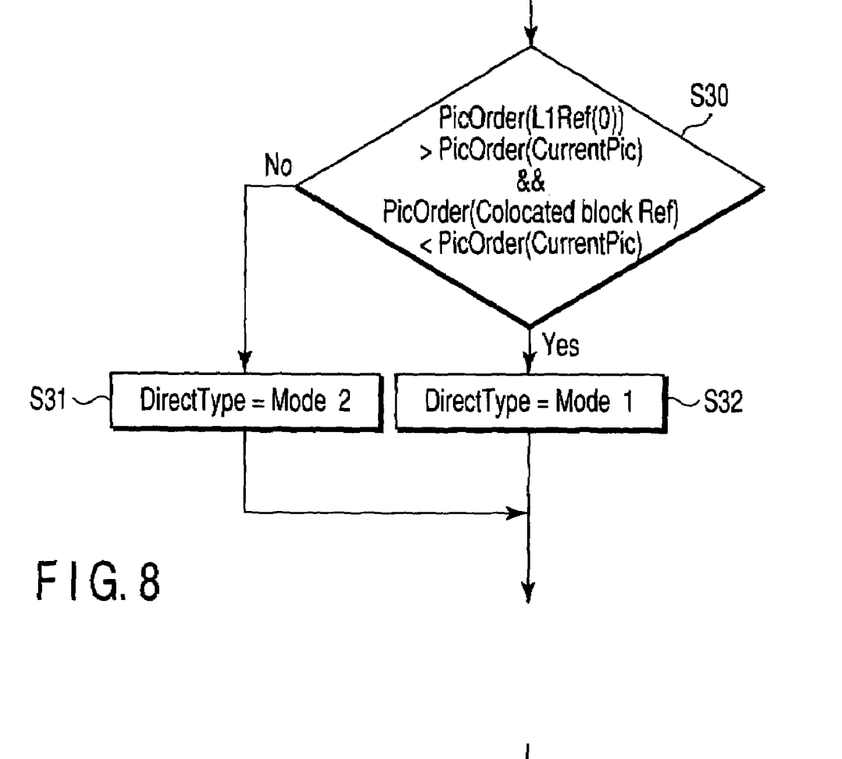
FIG. 8 is a flow chart of another direct mode type determination process related to the embodiment of the present invention.

In the example of FIG. 8, the direct type is switched when the picture order PicOrder(L1Ref(0)) of the zero-numbered reference frame L1Ref(0) with respect to the current encoding frame is higher than the picture order Picorder(CurrentPic) of the to-be-encoded frame, and the picture order PicOrder(Colocated block Ref) of the reference frame "Colocated block Ref" corresponding to the block "Colocated block" that is located at the same position as the to-be-encoded block is lower than picture order PicOrder (CurrentPic) of the to-be-encoded frame and it is not so. The former indicates that the block of the same position as the to-be-encoded block in the zero-numbered reference frame steps over the to-be-encoded frame.

The example of FIG. 8 has substantially the same effect as that of the example of FIG. 6. However, an optimum direct mode using a temporal correlation can be set by switching the direct mode type according to presence of a correlation between the pixel blocks of the frames existing before and after with respect to time.

Figure 9:
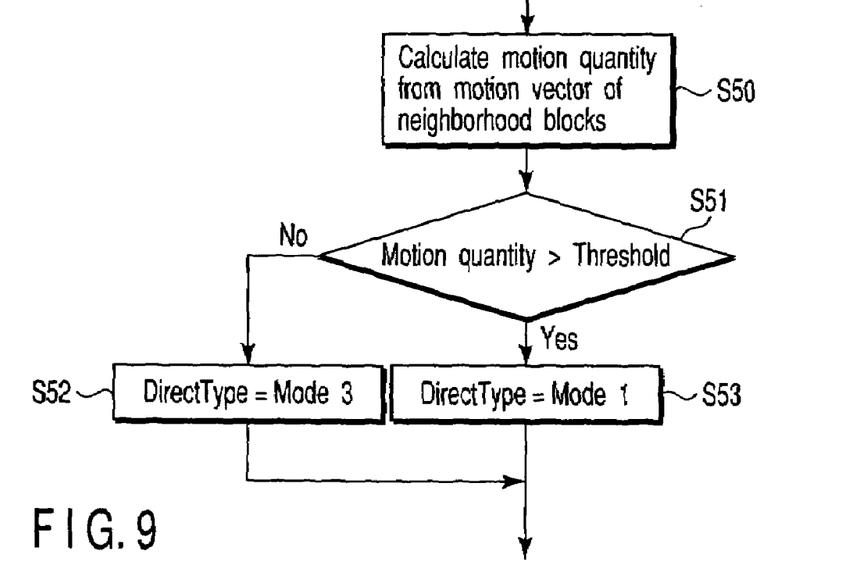
FIG. 9 is a flow chart of another direct mode type determination process related to the embodiment of the present invention.

In the example of FIG. 9, the size of a motion vector between adjacent pixel blocks in the encoded frame is calculated (step S50). The direct type is changed depending on whether or not the size of the motion vector exceeds a given value. In other words, when the movement quantity, that is, the vector size is more than a given value, a direct type (mode 3) using a spatial correlation is selected. When it is not more than the given value, a direct type (mode 1) using a time correlation is selected. When the movement is more than a given value, the correlation with respect to the adjacent pixel block is strong but the correlation between the blocks at the same position between the frames decreases. In contrast, when the movement is not more than the given value, the correlation between the blocks at the same position between the flames increases. The direct mode is automatically changed matching with the characteristics of such a video. As a result, the selection frequency of the direct mode increases, the encoding overhead for encoding the motion compensation information such as motion vectors reduces. This improves the encode efficiency more.

Figure 10:
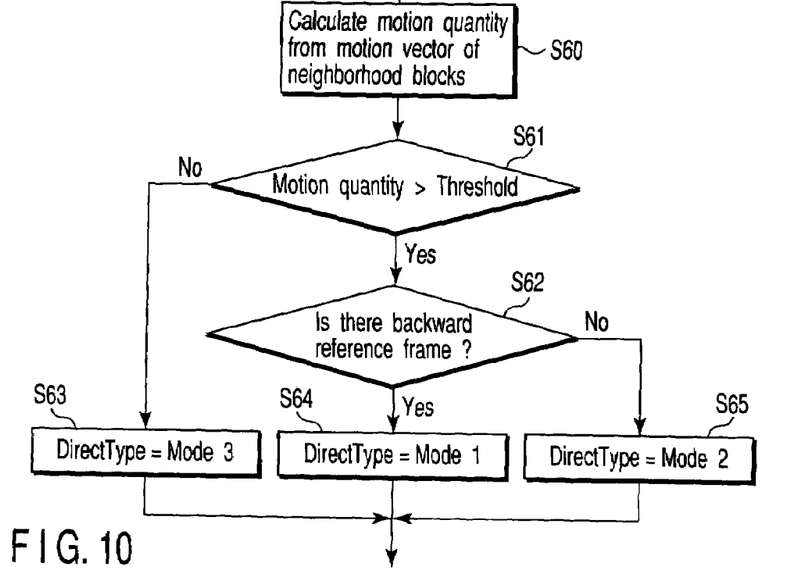
FIG. 10 is a flow chart of another direct mode type determination process related to the embodiment of the present invention.
Figure 11:
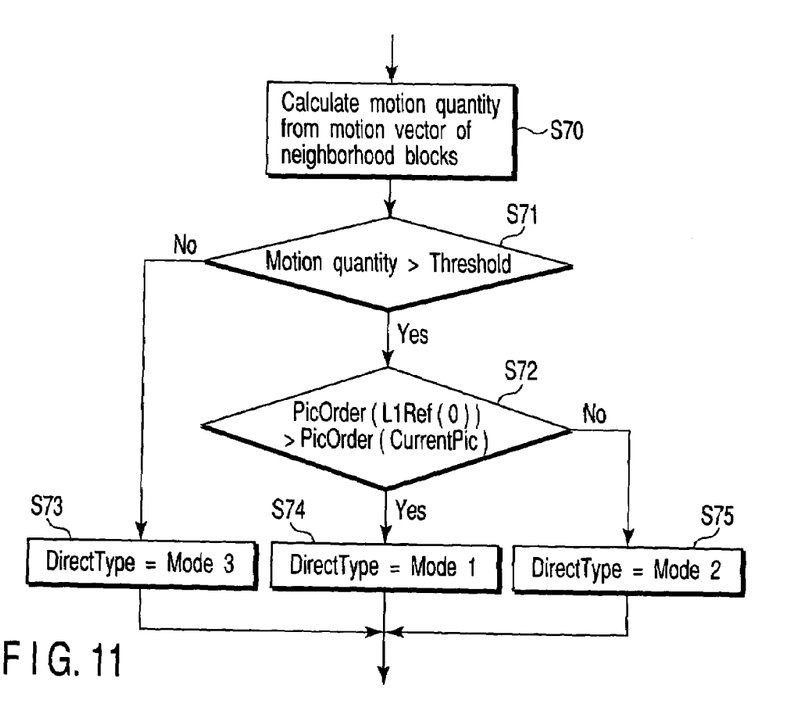
FIG. 11 is a flow chart of another direct mode type determination process related to the embodiment of the present invention.
Figure 12:
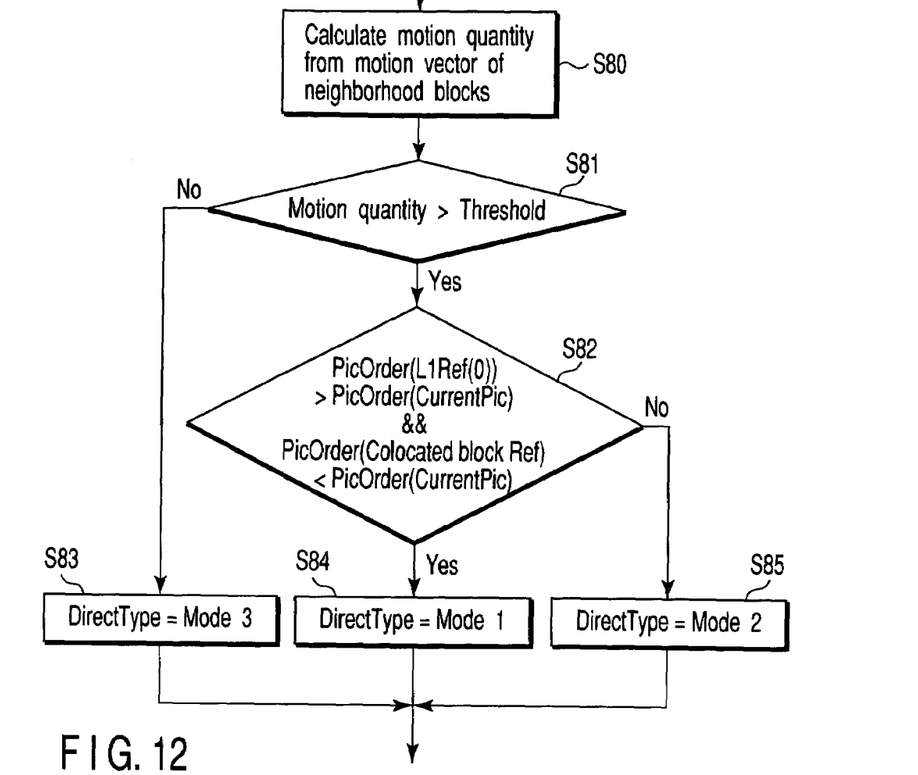
FIG. 12 is a flow chart of another direct mode type determination process related to the embodiment of the present invention.

The examples of FIGS. 10, 11 and 12 are combinations of the examples of FIGS. 6, 7 and 8 with the example of FIG. 9. According to such a configuration, a direct type using an optimum correlation of a correlation with respect to the past, a correlation with respect to the past and the future, and a spatial correlation is selected matching with the property of the picture.

According to the example of FIG. 10, the size of the motion vector between adjacent pixel blocks in the encoded frame is calculated (step S60). It is determined whether or not the size of the motion vector exceeds a given value (S61). When the determination is NO, the direct mode is changed to the mode 3 (S63). If the determination is YES, it is determined whether or not there is a backward frame (S62). If the determination is YES, the direct mode is changed to the mode 1 (S64). If it is No, the direct mode is changed to the mode 2 (S65).

According to the example of FIG. 11, the size of the motion vector between adjacent pixel blocks in the encoded frame is calculated (step S70). It is determined whether or not the size of the motion vector exceeds a given value (S71). When the determination is NO, the direct mode is changed to the mode 3 (S73). If the determination is YES, it is determined whether or not the picture order PicOrder (L1Ref(0)) is higher than the picture order PicOrder(CurrentPic) (S72). If the determination is YES, the direct mode is changed to the mode 1 (S74). If it is No, the direct mode is changed to the mode 2 (S75).

According to the example of FIG. 12, the size of the motion vector between adjacent pixel blocks in the encoded frame is calculated (step S80). It is determined whether or not the size of the motion vector exceeds a given value (S81). When the determination is NO, the direct mode is changed to the mode 3 (S83). If the determination is YES, it is determined whether or not the picture order PicOrder (L1Ref(0)) is higher than the picture order PicOrder(CurrentPic) and the picture order PicOrder(Collocated block Ref) is lower than the picture order PicOrder(CurrentPic) (S72). If the determination is YES, the direct mode is changed to the mode 1 (S84). If it is No, the direct mode is changed to the mode 2 (S85). The encoding efficiency is improved by the above examples.

Figure 13:
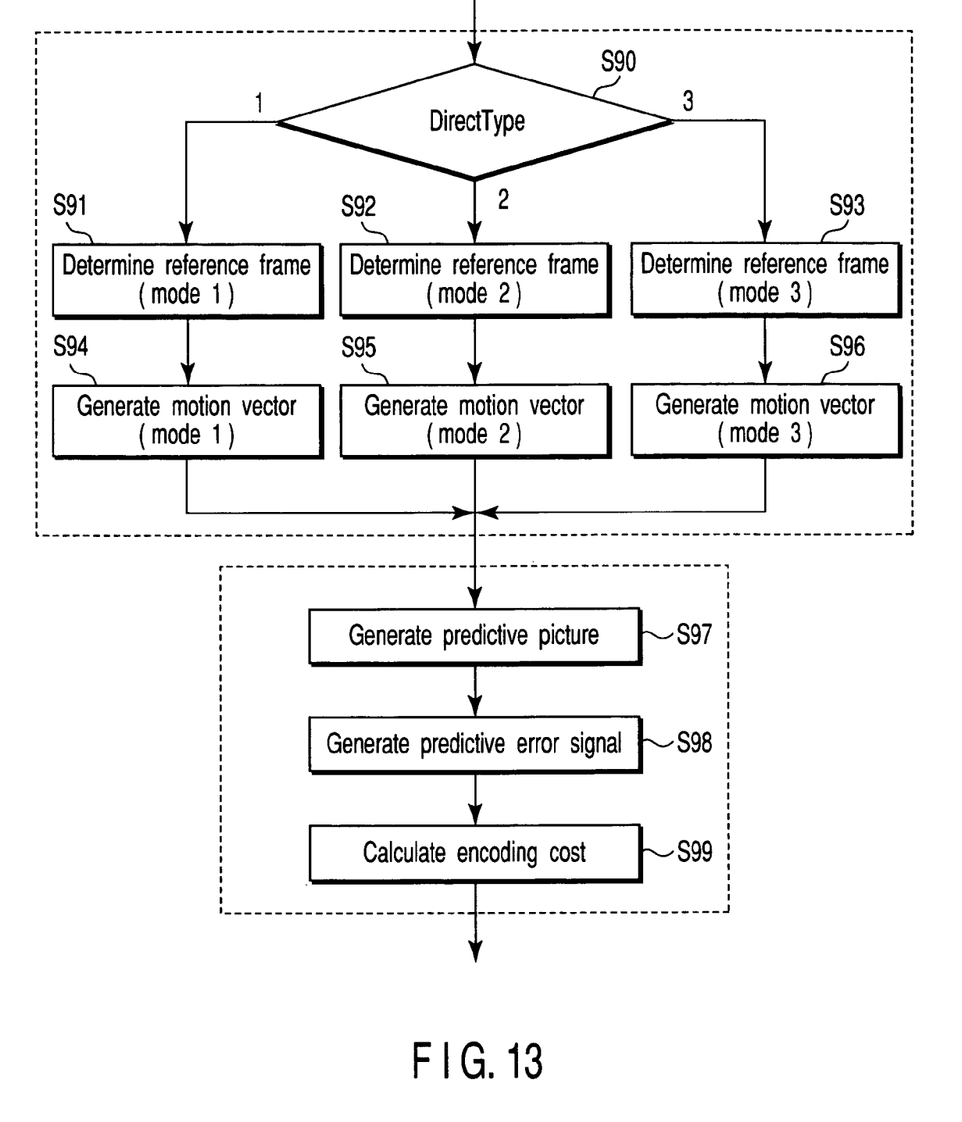
FIG. 13 is a flow chart of an encoding process in a direct mode related to the embodiment of the present invention.

FIG. 13 shows a flowchart for the motion compensation parameter determination (S3) of the direct mode and the direct mode cost calculation (S4) in FIG. 4. According to the direct type (step S90) determined according to the direct mode type determination step (S2), determination of the reference frame (S91 or S92 or S93) and determination of the motion vector (S94 or S95 or S96) are done. Generation of a predictive picture (step S97), generation of a predictive error signal with respect to the to-be-encoded pixel block (step S98), and calculation of an encoding cost (step S99) are executed sequentially, using the determined reference frame and motion vector.

A determination method of a reference frame and a motion vector of each direct type will be described in detail.

Figure 14:
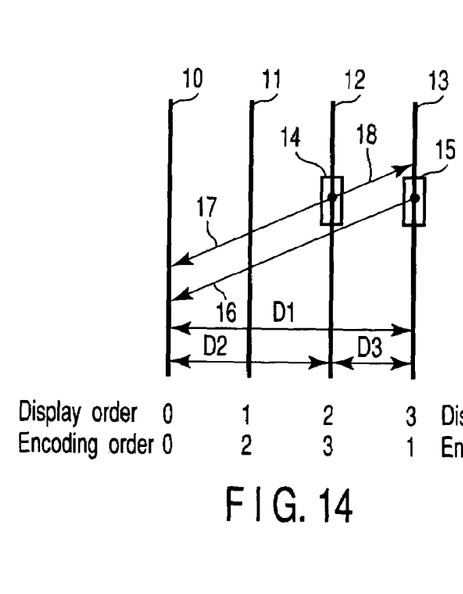
FIG. 14 is a diagram for explaining a direct mode prediction related to the embodiment of the present invention.
Figure 15:
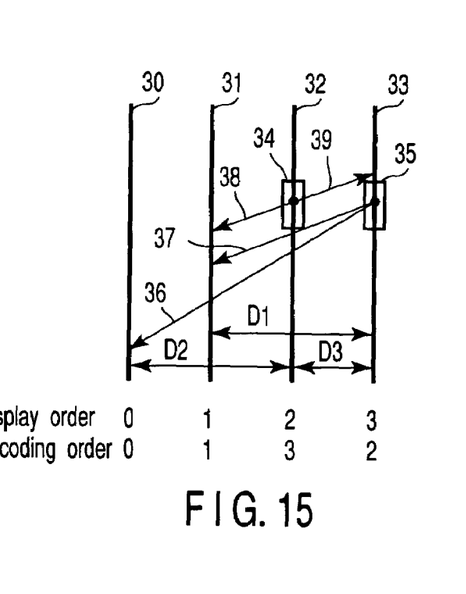
FIG. 15 is a diagram for explaining a direct mode prediction related to the embodiment of the present invention.
Figure 16:
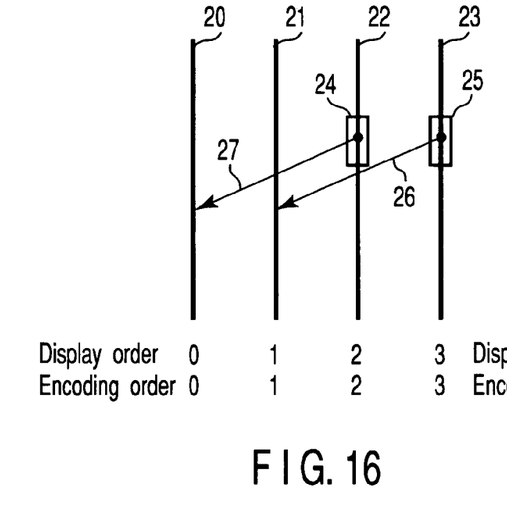
FIG. 16 is a diagram for explaining a direct mode prediction related to an embodiment of the present invention.
Figure 17:
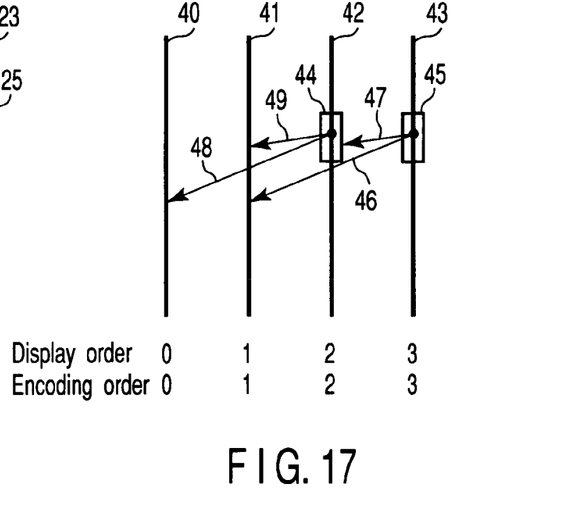
FIG. 17 is a diagram for explaining a direct mode prediction related to the embodiment of the present invention.
Figure 18:
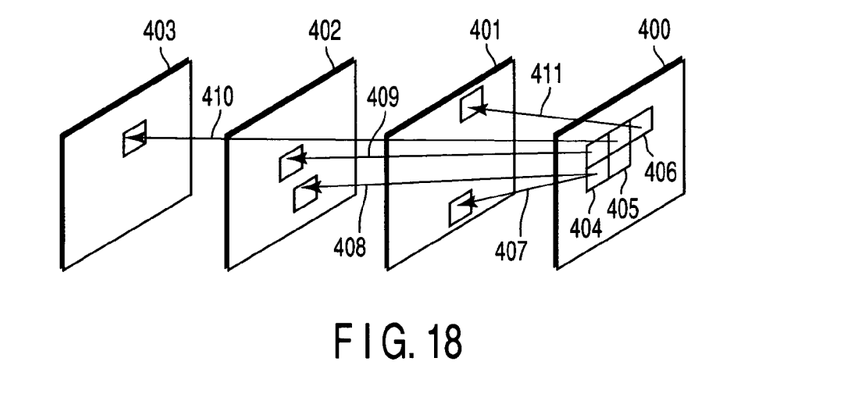
FIG. 18 is a diagram for explaining a direct mode prediction related to the embodiment of the present invention.
Figure 19:
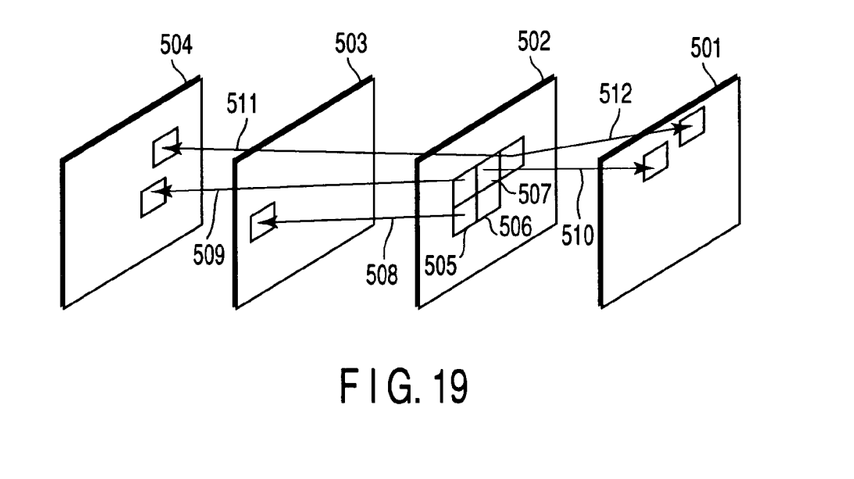
FIG. 19 is a diagram for explaining a direct mode prediction related to the embodiment of the present invention.

FIGS. 14 and 15 show a determination method of a reference frame and a motion vector of the direct type mode 1 using a correlation with respect to the forward and backward flames. FIGS. 16 and 17 show a determination method of a reference frame and a motion vector of the direct type mode 2 using a correlation with respect to the past frame. FIGS. 18 and 19 show a determination method of a reference frame and a motion vector of the direct type mode 3 using a spatial correlation.

In FIG. 14, a frame 12 is a to-be-encoded frame, a frame 13 is a future reference frame, and a frame 10 is a past reference frame. The order of flames 10, 11, 12 and 13 is a display order of the flames. On the other hand, encoding is done in a sequence of the frames 10, 13, 11 and 12. A block 14 is a to-be-encoded pixel block. A block 15 is a pixel block in the backward reference flame 13 that is located at the same position as the to-be-encoded block 14. The pixel block 15 is generated by a motion compensation predictive encoding using the reference frame 10 and the motion vector 16.

In a direct mode to the pixel block 14, an interpolative prediction using the frames 10 and 13 is done. In this time, motion vectors 17 and 18 obtained by scaling the motion vector 16 according to a ratio of frame-to-frame distances with respect to the frame 12 are used. In other words, the motion vector 17 is D2/D1 times the motion vector 16, and the motion vector 18 is −D3/D1 times the motion vector 16. D1, D2 and D3 indicate a frame-to-frame distance between the frames 10 and 13, a frame-to-frame distance between the frames 10 and 12, and a frame-to-frame distance between the frames 12 and 13, respectively.

In FIG. 15, a frame 32 is a to-be-encoded frame, a frame 33 is a future reference frame, and frames 30 and 31 are past reference frames. The order of flames 30, 31, 32 and 33 is a display order of flames. On the other hand, encoding is done in a sequence of frames 30, 31, 33 and 32. A block 34 is a to-be-encoded pixel block, and a block 35 is a pixel block in the backward reference flame 33 that is located at the same position as the to-be-encoded pixel block 34.

The pixel block 35 is encoded using a predictive signal obtained by a linear sum of reference blocks extracted from the reference frames 30 and 31 using the motion vectors 36 and 37.

In a direct mode to the pixel block 34, one of two motion vectors 36 and 37 of the pixel block 35 is selected (it is assumed that the motion vector 37 having a small distance with respect to the reference frame is selected). The selected motion vector 37 is scaled by the same manner as the example of FIG. 14, to perform an interpolation prediction using frames 31 and 33.

In FIG. 16, a frame 23 is a to-be-encoded frame, and frames 20,21 and 22 are past reference frames. The display and encoding are done in the order of flames 20, 21, 22 and 23. Therefore, there is no future reference frame. A block 25 is a to-be-encoded pixel block, and a block 24 is a pixel block in the reference frame 22 just before the frame 23 that is located at the same position as the to-be-encoded block 25. The pixel block 24 is subjected to a predictive encoding using a motion vector 27 and the reference frame 20.

In a direct mode to the pixel block 25, a reference frame is determined by a correlation similar to the pixel block 24. The pixel block 25 is subjected to a motion compensation predictive encoding using a motion vector of the pixel block 24. In other words, the motion vector 26 of the pixel block 25 is the same motion vector as the motion vector 27. Since the flame 20 before two frames is referred to the pixel block 24, a frame before two flames from the frame 20, that is, the frame 21 is used as a reference frame in the pixel block 25.

In FIG. 17, a frame 43 is a to-be-encoded frame, and frames 40, 41 and 42 are past reference frames. The display and encoding are done in order of the flames 40, 41, 42 and 43. Therefore, there is no future reference frame similarly to FIG. 16. A block 45 is a to-be-encoded pixel block, and a block 44 is a pixel block in the reference frame 42 just before the frame 45 that is located at the same position as the to-be-encoded block 45.

The pixel block 44 is subjected to a predictive encoding based on a linear sum of the blocks extracted from the reference frames 40 and 41 using the motion vectors 48 and 49.

In a direct mode to the pixel block 45, a reference frame is determined by a correlation similar to the pixel block 44. The pixel block 45 is subjected to a motion compensation predictive encoding using the motion vector and predictive mode of the pixel block. In other words, the motion vectors 46 and 47 of the pixel block 45 are the same motion vectors as the motion vectors 48 and 49, respectively. The frame 40 before two frames and the flame 41 before one frame are referred to in the pixel block 44. Therefore, the pixel block 45 is subjected to a predictive encoding based on a linear sum of reference blocks extracted from the reference flame 41 before two flames and the reference frame 42 before one flame from the corresponding frame 43.

In FIG. 18, a frame 400 is a to-be-encoded frame, and frames 401, 402 and 403 are past reference frames. The display and encoding are done in order of the flames 403, 402, 401 and 400. Therefore, there is no future reference frame similarly to FIGS. 16 and 17. A block 405 is a to-be-encoded pixel block, and blocks 404, 405, 406, etc. are pixel blocks in the same encoded flame. In a direct mode of the example of FIG. 18, a predictive encoding is done using the motion vector of the pixel block of adjacent encoded pixel blocks that refers to a flame near to the to-be-encoded frame with respect to time.

In other words, in the example of FIG. 18, the pixel block 406 is predictive-encoded using only the frame 401 just before the frame 400. In a direct mode to the pixel block 405, a predictive encoding is subjected to the pixel block 405 using a motion vector 411 and the reference flame 401.

In FIG. 19, a frame 502 is a to-be-encoded frame, and frames 503 and 504 are past reference frames. A flame 501 is a future reference frame. The frames 504, 503, 502 and 501 are displayed in this order. Encoding is done in order of frames 504, 503, 501 and 502. A block 506 is a to-be-encoded pixel block, and blocks 505, 507, etc. are pixel blocks in the same encoded frame.

In a direct mode of the example of FIG. 19, a predictive encoding is done using the motion vectors of the pixel blocks of adjacent encoded pixel blocks that refer to past and future flames near to the to-be-encoded frame with respect to time.

In the example of FIG. 18, the pixel block 505 is subjected to a predictive encoding using the frame 503 just before the frame 502. The pixel block 507 is predictive-encoded using the flame 501 just after the frame 502. Therefore, in a direct mode to the pixel block 506, an encoding based on an interpolative prediction is done using the frames 503 and 501 extracted by the motion vectors 508 and 510, respectively. In other words, the pixel block 506 is encoded by interpolating the blocks extracted from the frames 503 and 501 according to the motion vectors 508 and 510.

Figure 20:
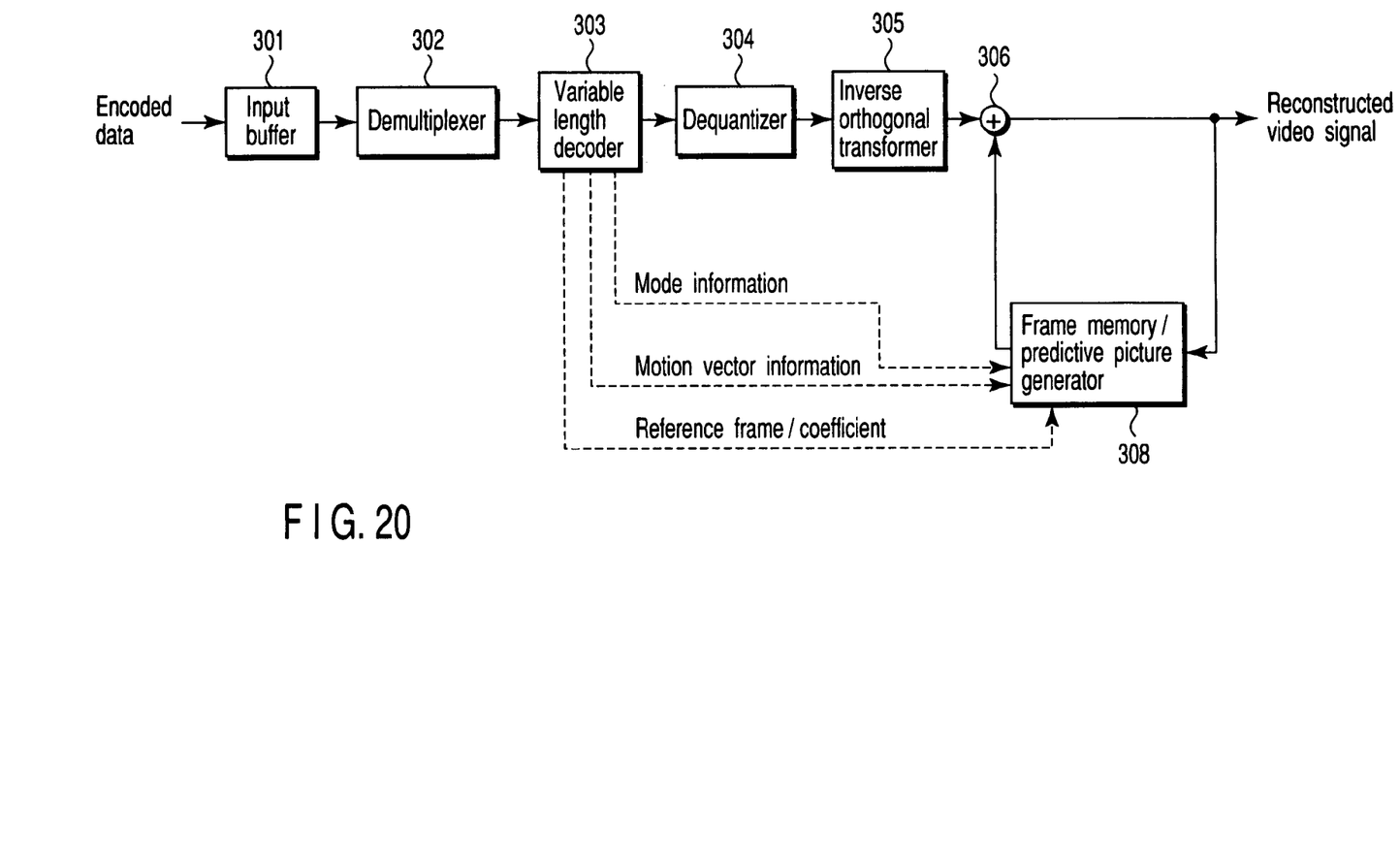
FIG. 20 is a block diagram of a video decoding apparatus according to the embodiment of the present invention.

FIG. 20 shows a block circuit of a video decoding apparatus according to an embodiment of the present invention. The video decoding apparatus decodes video data encoded by the video encoding apparatus according to the above embodiment of the present invention.

Input encoded data is supplied to a variable-length decoder 303 through a buffer 301 and a demultiplexer 302 to be variable-length decoded. The variable-length decoder 303 outputs a quantized orthogonal transformation coefficient, predictive mode information, motion vector information, reference frame information, predictive coefficient information, etc.

A dequantizer 304 dequantizes the quantized orthogonal transformation coefficient. An inverse orthogonal transformer 305 subjects the dequantized orthogonal transformation coefficient to an inverse-orthogonal transformation. The output signal of the inverse orthogonal transformer 305 is added to a predictive picture generated by a frame memory/predictive picture generator 308 every motion compensation predictive block to generate a playback video. The predictive picture generator generates a prediction block signal based on the predictive mode, motion vector, reference frame information and predictive coefficient information. When the predictive mode is a direct mode, a direct mode type is determined from the interframe predictive configuration, the motion compensation parameters of adjacent pixel blocks and so on similarly to the video encoding apparatus. The reference frame and motion vector are generated according to the determined direct mode type. A predictive signal is generated using the generated motion compensation parameters and decoded.

Figure 21:
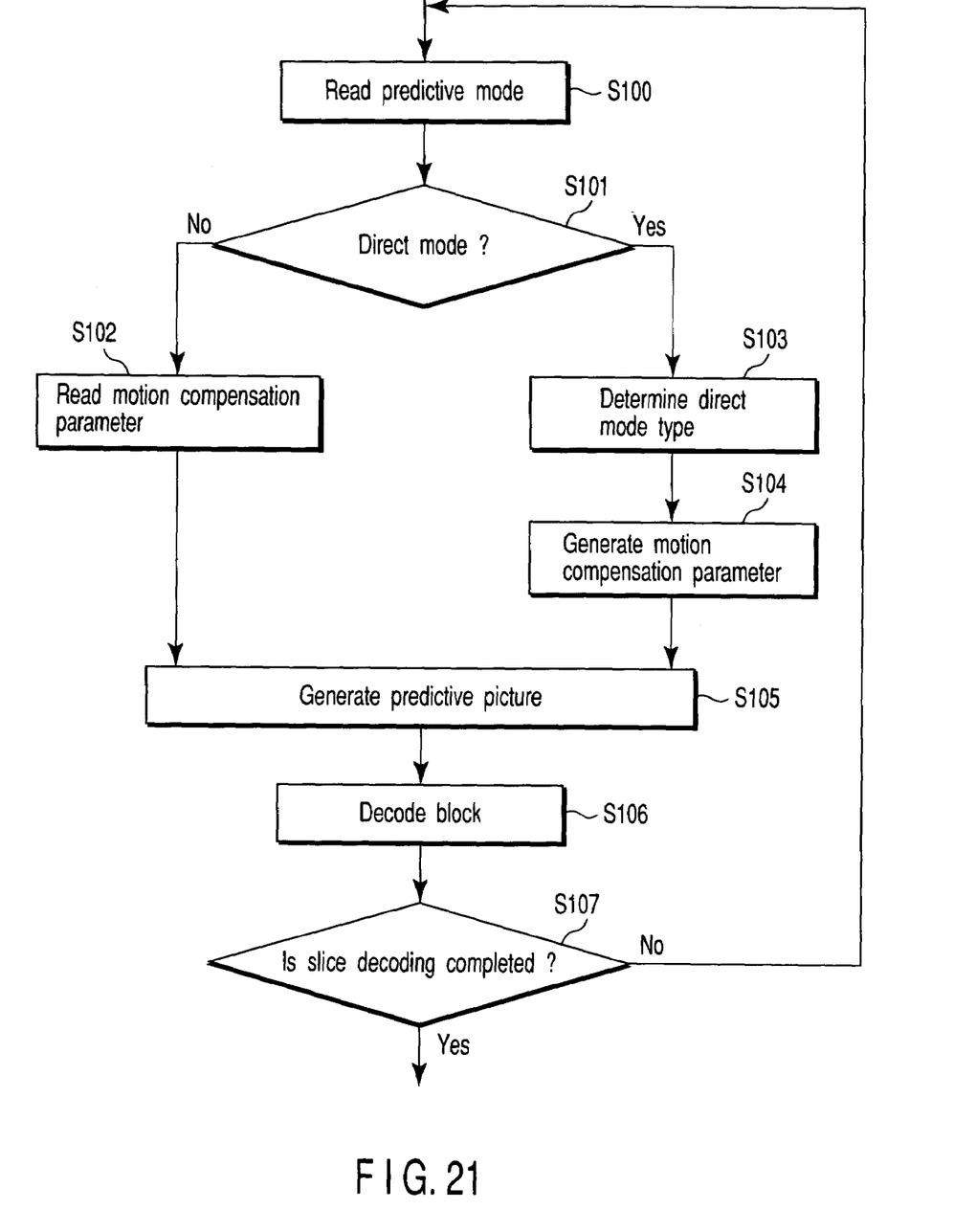
FIG. 21 shows a flow chart of a decoding process related to the embodiment of the present invention.

FIG. 21 is a flow chart showing a procedure of executing a predictive decoding every pixel block in the video decoding apparatus of the embodiment of the present invention.

Predictive mode information is read from encoded data every pixel block in a slice (step S100). It is determined whether or not the predictive mode is a direct mode (step S101). When the predictive mode is not a direct mode but a normal predictive encoding mode, motion compensation parameters such as reference frame, motion vector information, etc. are read from the encoded data (step S102). A predictive picture is generated according to the read parameters (step S105). The generated predictive signal is added to a decoded predictive error signal whereby the pixel block is decoded (step S106).

On the other hand, when the predictive mode is a direct mode, a direct mode type is determined similarly to the encoding (S103), and the motion compensation parameter is generated (S104). A predictive picture is generated using the motion compensation parameter (step S105). The predictive picture is decoded in units of a block (step S106). It is determined whether or not decoding of a slice is completed. If the slice decoding is not completed, the process returns to step S100. If the slice decoding is completed, the process finishes.

Determination of the direct type (step S103) and generation of the motion compensation parameter (step S104) are done in a manner similar to the determination of the direct type and generation of the motion compensation parameter of the video encoding apparatus shown in FIGS. 6 to 19.

There will be described a method of determining the reference frame that becomes a predictive source of a motion compensation predictive parameter in generation of a motion compensation predictive parameter in a direct mode using a temporal correlation.

(A Criterion of a Reference Frame to be a Predictive Source)

In the case of a scheme to make a predictive picture only by a plurality of the past reference frames, the predictive source is a macroblock of a reference frame of selectable reference frames that is encoded last with respect to time, the macroblock located at spatially the same position as a to-be-decoded macroblock.

A criterion for selecting a reference frame becoming a predictive source may be to select a reference frame of selectable reference frames that can be encoded by the minimum encode length or to select the minimum reference frame number.

(A Criterion of a Reference Field to be a Predictive Source in the Case of a Field Encoding)

An input video signal is an interlaced signal and encoded in units of a field. In the case of an interlaced signal, it is desirable that the predictive source is set at spatially the same position as a to-be-encoded field. Therefore, when a predictive picture is generated only by a plurality of past reference frames/fields, a macroblock of the reference field of selectable reference fields that is encoded last with respect to time and has the same phase, the macroblock located at spatially the same position as a to-be-decoded macroblock, is preferably assumed as a predictive source.

A criterion for selecting a reference frame as a predictive source may be to select a reference field of selectable reference frames that can be encoded by the minimum encode length or to select the minimum reference field number.

There will be described a method of generating motion compensation predictive information in a frame memory/predictive picture generator in a decoder.

(A Criterion of a Reference Frame to be a Predictive Source)

In the case of a scheme to make a predictive picture only by a plurality of the past reference frames, the predictive source assumes a macroblock of a reference frame of selectable reference frames that is decoded last with respect to time, the macroblock located at spatially the same position as a to-be-decoded macroblock.

A criterion for selecting a reference frame to be a predictive source may be to select a reference frame of selectable reference frames that can be encoded by the minimum encode length or to select the minimum reference frame number. However, the same criterion as that of the encoder must be adopted.

(A Criterion of a Reference Field to be a Predictive Source in the Case of a Field Encoding)

An input video signal is an interlaced signal, and decoded in units of a field. In the case of the interlaced signal, it is desirable that the predictive source is located at spatially the same position as a to-be-encoded block. Therefore, in the case of a scheme to make a predictive picture only by a plurality of the past reference frames/fields, a macroblock of the reference field of selectable reference fields that is encoded last with respect to time and has the same phase, the macroblock located at spatially the same position as a to-be-encoded macroblock is preferably assumed as the predictive source.

A criterion for selecting a reference field to be a predictive source may be to select a reference field of selectable reference fields that can be encoded by the minimum encode length or to select the minimum reference frame number. However, the same criterion as that of the encoder must be adopted.

According to the present invention as discussed above, by estimating adequately a motion compensation parameter using a structure of an interframe prediction and movement information of a peripheral block, motion compensation information can be estimated in stable and efficient independent of an interframe predictive configuration and a property of picture, resulting in making it possible to realize a high efficient video encoding and decoding method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video encoding method of encoding an input video signal by a motion compensation predictive interframe encoding, comprising:

selecting, from a plurality of predictive modes, a predictive mode including determining a motion vector of a to-be-encoded pixel block by using a motion vector of an encoded pixel block of a reference frame adjacent to a to-be-encoded frame;

computing a first cost of encoding based on the selected predictive mode;

computing a second cost of encoding based on a direct mode including determining a motion vector of the to-be-encoded pixel block from a motion vector of an encoded block around the to-be-encoded pixel block;

comparing the second cost with the first cost to determine one of the selected predictive mode and the direct mode as a determined predictive mode; and encoding the pixel block by the motion compensation predictive encoding according to the determined predictive mode.

2. The video encoding method according to claim 1, wherein selecting the predictive mode includes detecting a motion vector using a block shape of the pixel block and the reference frame, generating a predictive signal using the detected motion vector, generating a predictive error signal from the predictive signal and a signal of the to-be-encoded pixel block, computing an encoding cost in the predictive mode, updating the block shape according to the encoding cost and an index of the reference frame, and repeating motion detection and cost computation for all reference frames to determine the predictive mode.

3. The video encoding method according to claim 1, which includes switching the direct mode between a first mode and a second mode depending on whether a future reference frame exists with respect to the to-be-encoded frame, the first mode using a correlation with respect to past and future frames, and the second mode using a correlation with respect to the past frame.

4. The video encoding method according to claim 1, which includes switching the direct mode between a first mode and a second mode when a picture order of a reference frame with respect to the to-be-encoded frame is higher than the picture order of the to-be-encoded frame, the first mode using a correlation with respect to past and future frames, and the second mode using a correlation with respect to the past frame.

5. The video encoding method according to claim 1, which includes switching the direct mode between a first mode and a second mode when a picture order of a reference frame with respect to the to-be-encoded frame is higher than the picture order of the to-be-encoded frame, and the picture order of a reference frame corresponding to a block that is located at the same position as the to-be-encoded block is lower than the picture order of the to-be-encoded frame, the first mode using a correlation with respect to past and future frames, and the second mode using a correlation with respect to the past frame.

6. The video encoding method according to claim 1, which includes computing a size of a motion vector between adjacent pixel blocks in an encoded frame, and changing the direct mode between a first mode and a second mode depending on whether or not a size of the motion vector exceeds a given value, the first mode using a correlation with respect to past and future frames, and the second mode using a spatial correlation.

7. The video encoding method according to claim 1, which includes computing a size of a motion vector between adjacent pixel blocks in an encoded frame, and changing the direct mode to a first mode when the size of the motion vector exceeds a given value and there is a backward frame, to a second mode when the size of the motion vector exceeds the given value and there is no backward frame, and to a third mode when the size of the motion vector is less than the given value, the first mode using a correlation with respect to past and future frames, and the second mode using a correlation with respect to the past frame, and the third mode using a spatial correlation.

8. The video encoding method according to claim 1, which includes computing a size of a motion vector between adjacent pixel blocks in an encoded frame, and changing the direct mode to a first mode when the size of the motion vector exceeds a given value and a picture order of a reference frame with respect to the to-be-encoded frame is higher than the picture order of the to-be-encoded frame, to a second mode when the size of the motion vector exceeds the given value and a picture order of a reference frame with respect to the to-be-encoded frame is lower than the picture order of the to-be-encoded frame, and to a third mode when the size of the motion vector is less than the given value, the first mode using a correlation with respect to past and future frames, and the second mode using a correlation with respect to the past frame, and the third mode using a spatial correlation.

9. The video encoding method according to claim 1, which includes computing a size of a motion vector between adjacent pixel blocks in an encoded frame, and changing the direct mode to a first mode when the size of the motion vector exceeds a given value and a picture order of a reference frame with respect to the to-be-encoded frame is higher than the picture order of the to-be-encoded frame, and the picture order of a reference frame corresponding to a block that is located at the same position as the to-be-encoded block is lower than the picture order of the to-be-encoded frame, to a second mode when the size of the motion vector exceeds the given value and a picture order of a reference frame with respect to the to-be-encoded frame is higher than the picture order of the to-be-encoded frame, and the picture order of a reference frame corresponding to a block that is located at the same position as the to-be-encoded block is higher than the picture order of the to-be-encoded frame, and to a third mode when the size of the motion vector is less than the given value, the first mode using a correlation with respect to past and future frames, and the second mode using a correlation with respect to the past frame, and the third mode using a spatial correlation.

10. The video encoding method according to claim 1, which includes executing the direct mode by an interpolative prediction using two frames between which the to-be-encoded frame is interposed.

11. The video encoding method according to claim 1, which includes executing the direct mode by using a motion vector of a pixel block that refers to a frames near to the to-be-encoded frame with respect to time.

12. The video encoding method according to claim 1, which includes executing the direct mode by using motion vectors of adjacent encoded pixel blocks that refer to past and future frames near to the to-be-encoded frame with respect to time.

13. A video encoding method of encoding an input video signal by a motion compensation predictive interframe encoding, comprising:

selecting, from a plurality of predictive modes, a predictive mode including determining a motion vector of a to-be-encoded pixel block by using a motion vector of an encoded pixel block of a reference frame adjacent to a to-be-encoded frame;

computing a first cost of encoding based on the selected predictive mode;

computing a second cost of encoding based on a direct mode including determining a motion vector of the to-be-encoded pixel block from a motion vector of an encoded block around the to-be-encoded pixel block;

comparing the second cost with the first cost to determine one of the selected predictive mode and the direct mode as a determined predictive mode; and encoding the pixel block by the motion compensation predictive encoding according to the determined predictive mode, using a motion compensation parameter including at least one of motion vector information, reference frame selection information and pixel block shape information, the motion vector information being motion vector information of the encoded pixel block in the reference frame just before the to-be-encoded pixel frame, the encoded block being located at the same position as the to-be-encoded pixel block.

14. The video encoding method according to claim 13, which includes determining the motion compensation parameter, using a macroblock of a reference frame encoded last that is located at spatially the same position as the to-be-decoded macroblock.

15. The video encoding method according to claim 13, which includes determining the motion compensation parameter, using a reference frame encoded by a minimum encode length.

16. A video encoding method of encoding an input video signal, comprising:
selecting, from a plurality of predictive modes, a predictive mode including determining a motion vector of a to-be-encoded pixel block using a motion vector of an encoded pixel block of a reference frame adjacent to a to-be-encoded frame;
computing a first cost of encoding based on the selected predictive mode;
computing a second cost of encoding based on a direct mode including determining a motion vector of the to-be-encoded pixel block from a motion vector of a block around the to-be-encoded pixel block;
comparing the second cost with the first cost to determine an optimum predictive mode; and
encoding the pixel block by a motion compensation predictive encoding according to the optimum predictive mode.

17. A video encoding method of encoding an input video signal, comprising:
selecting, from a plurality of predictive modes, a predictive mode including determining a motion vector of a to-be-encoded pixel block using a motion vector of an encoded pixel block of a reference frame adjacent to a to-be-encoded frame;
computing a first cost of encoding based on the selected predictive mode;
computing a second cost of encoding based on a direct mode including determining a motion vector of the to-be-encoded pixel block from a motion vector of a block around the to-be-encoded pixel block;
comparing the second cost with the first cost to determine an optimum predictive mode; and
encoding the pixel block by a motion compensation predictive encoding according to the optimum predictive mode, using a motion compensation parameter including at least one of motion vector information, reference frame selection information and pixel block shape information, the motion vector information being motion vector information of the encoded pixel block in the reference frame nearly before and having the same phase as the to-be-encoded pixel frame which is at the same position as the to-be-encoded pixel block.

18. The video encoding method according to claim 17, which includes determining the motion compensation parameter, using a macroblock of a reference frame encoded last that is located at spatially the same position as the to-be-decoded macroblock and the same phase as it.

19. A video decoding method of decoding encoded video data every pixel block, comprising:
determining whether a predictive mode of the encoded video data is a direct mode;
reading a first motion compensation parameter from the encoded video data when the predictive mode fails to be the direct mode;
determining a type of the direct mode when the predictive mode is the direct mode to generate a second motion compensation parameter of a peripheral pixel block;
generating a first predictive picture using the first motion compensation parameter; and
generating a second predictive picture using a peripheral decoded block according to the second motion compensation parameter; and
decoding the first predictive picture and the second predictive picture.

20. The video decoding method according to claim 19, which includes decoding the encoded data to obtain motion vector information, reference frame selection information and pixel block shape information; and the decoding includes decoding the first predictive picture and the second predictive picture every pixel block, using at least one of the motion vector information, the reference frame selection information and the pixel block shape information, the motion vector information being motion vector information of an encoded pixel block in a reference frame just before the encoded pixel frame which is at the same position as the encoded pixel block.

* * * * *